United States Patent
Geyzel et al.

(10) Patent No.: US 8,824,859 B2
(45) Date of Patent: Sep. 2, 2014

(54) ADDING WATERMARKS TO VIDEO CONTENT

(75) Inventors: Zeev Geyzel, Tekoa (IL); Daniel Ratner, Tel Aviv (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/978,245

(22) PCT Filed: Jan. 1, 2012

(86) PCT No.: PCT/IB2012/050001
§ 371 (c)(1),
(2), (4) Date: Jul. 9, 2013

(87) PCT Pub. No.: WO2012/123825
PCT Pub. Date: Sep. 20, 2012

(65) Prior Publication Data
US 2013/0318550 A1    Nov. 28, 2013

Related U.S. Application Data

(60) Provisional application No. 61/465,270, filed on Mar. 16, 2011.

(51) Int. Cl.
| | |
|---|---|
| *H04N 9/80* | (2006.01) |
| *H04N 7/167* | (2011.01) |
| *G06K 9/00* | (2006.01) |
| *G06K 9/32* | (2006.01) |
| *H04L 9/32* | (2006.01) |
| *H04N 7/16* | (2011.01) |
| *H04N 21/254* | (2011.01) |
| *G06T 1/00* | (2006.01) |
| *H04N 21/426* | (2011.01) |
| *H04N 21/4627* | (2011.01) |
| *H04N 21/8358* | (2011.01) |
| *G06K 9/03* | (2006.01) |
| *G06F 7/04* | (2006.01) |
| *H04N 5/913* | (2006.01) |

(52) U.S. Cl.
CPC .. *H04N 21/2541* (2013.01); *H04N 2005/91392* (2013.01); *G06T 1/0028* (2013.01); *G06T 1/0085* (2013.01); *G06T 2201/0051* (2013.01); *H04N 5/913* (2013.01); *H04N 21/42684* (2013.01); *H04N 21/4627* (2013.01); *H04N 21/8358* (2013.01); *H04N 2005/91335* (2013.01)
USPC ........... 386/260; 386/311; 380/212; 380/213; 382/124; 382/162; 382/293; 382/309; 713/176; 725/25; 726/26

(58) Field of Classification Search
CPC .......... H04N 1/32144; H04N 1/32208; H04N 2201/3226; H04N 2201/3205; H04N 19/00557; H04N 9/8205; G11B 20/00884; G11B 20/00115; G06F 2221/0733; H04L 2209/608
USPC .................... 386/311, 260; 380/212, 213, 54; 382/124, 162, 293, 309; 713/176; 725/25; 726/26
See application file for complete search history.

(56) References Cited

U.S. PATENT DOCUMENTS

| | | | |
|---|---|---|---|
| 5,748,763 A | | 5/1998 | Rhoads |
| 6,373,960 B1 | * | 4/2002 | Conover et al. ............... 382/100 |

(Continued)

OTHER PUBLICATIONS

May 21, 2012 Transmittal of the International Search Report and Written Opinion of the International Searching Authority for the captioned application.

(Continued)

*Primary Examiner* — Hoang-Vu A Nguyen-Ba
(74) *Attorney, Agent, or Firm* — Husch Blackwell LLP

(57) ABSTRACT

A method for data display includes storing an identification code and receiving encoded video content for playback. The encoded video content is decoded so as to output a series of video frames while modulating a background level of the video frames in the series according to the identification code. Related systems and methods are also included.

14 Claims, 2 Drawing Sheets

(56) References Cited

U.S. PATENT DOCUMENTS

| | | |
|---|---|---|
| 6,400,371 B1 * | 6/2002 | Helman et al. .............. 345/589 |
| 6,400,827 B1 | 6/2002 | Rhoads |
| 6,496,591 B1 | 12/2002 | Rhoads |
| 6,542,620 B1 | 4/2003 | Rhoads |
| 6,590,996 B1 | 7/2003 | Reed et al. |
| 6,721,440 B2 | 4/2004 | Reed et al. |
| 6,850,626 B2 | 2/2005 | Rhoads et al. |
| 6,879,701 B1 | 4/2005 | Rhoads |
| 6,891,959 B2 | 5/2005 | Reed et al. |
| 7,058,979 B1 | 6/2006 | Baudry et al. |
| 7,068,809 B2 | 6/2006 | Stach |
| 7,072,487 B2 | 7/2006 | Reed et al. |
| 7,194,108 B2 | 3/2007 | Tapson |
| 7,242,790 B2 | 7/2007 | Rhoads |
| 7,266,217 B2 | 9/2007 | Rhoads et al. |
| 7,415,129 B2 | 8/2008 | Rhoads |
| 7,567,686 B2 | 7/2009 | Rhoads |
| 7,630,509 B2 | 12/2009 | Zarrabizadeh |
| 7,720,249 B2 | 5/2010 | Rhoads |
| 7,738,673 B2 | 6/2010 | Reed |
| 7,970,206 B2 * | 6/2011 | Harris et al. .............. 382/162 |
| 8,027,509 B2 | 9/2011 | Reed et al. |
| 2002/0027612 A1 | 3/2002 | Brill et al. |
| 2003/0197878 A1 | 10/2003 | Metois et al. |
| 2004/0034781 A1 * | 2/2004 | Natarajan .............. 713/181 |
| 2004/0052503 A1 * | 3/2004 | Noske et al. .............. 386/52 |
| 2004/0136562 A1 | 7/2004 | Sarraf et al. |
| 2006/0072780 A1 | 4/2006 | Zarrabizadeh |
| 2006/0235800 A1 | 10/2006 | Furlong et al. |
| 2006/0251252 A1 | 11/2006 | Quan |
| 2008/0010342 A1 | 1/2008 | Gebhardt et al. |
| 2009/0132547 A1 * | 5/2009 | Rhoads .............. 707/10 |
| 2010/0100971 A1 | 4/2010 | Geyzel et al. |
| 2010/0215342 A1 | 8/2010 | Lee et al. |
| 2011/0129116 A1 | 6/2011 | Thorwirth |

OTHER PUBLICATIONS

David J. Fleet et al., "Embedding Invisible Information in Color Images" *Proceedings of IEEE Conference on Image Processing*, vol. I, pp. 532-535 (Oct. 1997).

* cited by examiner

ADDING WATERMARKS TO VIDEO CONTENT

RELATED APPLICATION INFORMATION

The present application is a 35 USC §371 application of PCT/IB2012/050001, filed on 1 Jan. 2012 and entitled "ADDING WATERMARKS TO VIDEO CONTENT", which was published on 20 Sep. 2012 in the English language with International Publication Number WO 2012/123825 and which relies for priority on U.S. Provisional Patent Application Ser. No. 61/465,270 of Geyzel, et al., filed 16 Mar. 2011.

FIELD OF THE INVENTION

The present invention relates generally to systems and methods for video display, and specifically to encoding information into video sequences.

BACKGROUND OF THE INVENTION

Video content transmitted over communication networks is generally subject to copyright. The copyright imposes strict legal limits on the ways in which subscribers are allowed to use the content that they receive from the network. For example, in addition to viewing video programs while they are broadcast, subscribers may be allowed to record the programs for their own use, but they are typically not permitted to distribute recorded copies of the programs. Notwithstanding these legal limitations, however, unauthorized copying and distribution of video content remains a major problem.

The following references are believed to represent the state of the art:
U.S. Pat. No. 7,738,673 to Reed; and
U.S. Pat. No. 8,027,509 to Reed, et al.

SUMMARY

Embodiments of the present invention that are described hereinbelow provide methods and systems for encoding information into video sequences. These methods and systems may be used, inter alia, in identifying the source of copied video content.

There is therefore provided, in accordance with an embodiment of the present invention, a method for data display, including storing an identification code and receiving encoded video content for playback. The encoded video content is decoded so as to output a series of video frames while modulating a background level of the video frames in the series according to the identification code.

In some embodiments, the identification code uniquely identifies: a video playback device, which decodes and modulates the background level of the video frames; or a subscriber to whom the video playback device is assigned. The encoded video content is received in the video playback device from a transmission head-end, and modulating the background level includes receiving an instruction from the transmission head-end to begin modulating the background, and modulating the background responsively to the instruction.

In some embodiments, modulating the background level includes modifying a color of the background. Typically, the background level is defined by a luminance coordinate and two chrominance coordinates, and modifying the color includes modulating the two chrominance coordinates. In one embodiment, modulating the two chrominance coordinates includes encoding the identification code using an alphabet including four symbols mapped over the two chrominance coordinates. The modulation may be applied in a chrominance coordinate system that is rotated so as to diminish a visual effect of the modulation. Additionally or alternatively, modifying the color includes modulating the color of the background with a triangular waveform.

In disclosed embodiments, the video frames have a predetermined frame duration, and the background level is modulated with a modulation waveform having a period that is at least ten times the frame duration. Typically, modulating the background level includes generating a string of symbols representing the identification code, defining a modulation pattern corresponding to the string of the symbols, and applying the modulation pattern to the background level multiple times in succession, separated by an interval that is not an integer multiple of the modulation period.

The background level is typically modulated independently of the video content. In a disclosed embodiment, modulating the background level includes generating a background having an overall level that is modulated according to the identification code, and summing the background with the decoded video content.

In one embodiment, modulating the background level includes computing a codeword including the identification code and an error correcting code, generating a string of bits by taking an exclusive disjunction between the codeword and a selected constant word, and varying the background level over time according to the bits in the string.

There is also provided, in accordance with an embodiment of the present invention, data display apparatus, including a memory, which is configured to store an identification code. Processing circuitry is coupled to receive and decode encoded video content so as to output a series of video frames while modulating a background level of the video frames in the series according to the identification code.

There is additionally provided, in accordance with an embodiment of the present invention, a software product, including a computer-readable medium in which program instructions are stored, which instructions, when read by a processor, cause the processor to read an identification code from a memory, and to receive and decode encoded video content so as to output a series of video frames while modulating a background level of the video frames in the series according to the identification code.

The present invention will be more fully understood from the following detailed description of the embodiments thereof, taken together with the drawings in which:

DETAILED DESCRIPTION OF EMBODIMENTS

Unauthorized copies of video programs are widely distributed via the Internet and other media. Frequently a first-generation copy of an original, authorized presentation of the program (such as a television sports broadcast) is recorded by a subscriber, and the recorded copy is subsequently passed on and duplicated over and over, without authorization by the copyright owner. Although it is possible to locate and take action against distributors of these unauthorized copies, a more effective enforcement approach would be to attack the problem at its source, by finding the subscriber who made the first-generation copy.

Embodiments of the present invention that are described hereinbelow address this issue by causing each subscriber's video playback devices to apply a unique watermark to video content as it is played back. The watermark may be applied in response to instructions transmitted from the head-end, prior to or together with the content that is to be watermarked, and may thus be turned on and off as needed. When an unauthorized copy of the content is discovered, the watermark may be extracted by comparing the copy with the unmarked original. The watermark thus extracted identifies the source of the copy unequivocally and enables the content owner to take appropriate punitive and/or deterrent action, such as initiating legal proceedings and/or terminating the subscriber's access rights.

In the embodiments disclosed below, the watermark is applied by causing the video playback device to modulate the overall background level of the video frames that it generates as it decodes the video content for display. The modulation pattern corresponds to a string of symbols representing an identification code stored by the playback device. This approach is advantageous in that it takes advantage of capabilities that are already built into many playback devices (such as television set-top boxes) and can be carried out independently of the video content itself.

For the watermarking scheme to be effective, it is desirable that the watermark not be perceptible even to a keen-eyed user viewing the content. For this purpose, the inventor has found it advantageous to modify the color of the background with a slow, low-amplitude waveform. Specifically, if the background level is defined by a luminance coordinate and two chrominance coordinates, the two chrominance coordinates may be used in generating the modulation pattern. Details of this sort of implementation are presented below.

Figure 1:
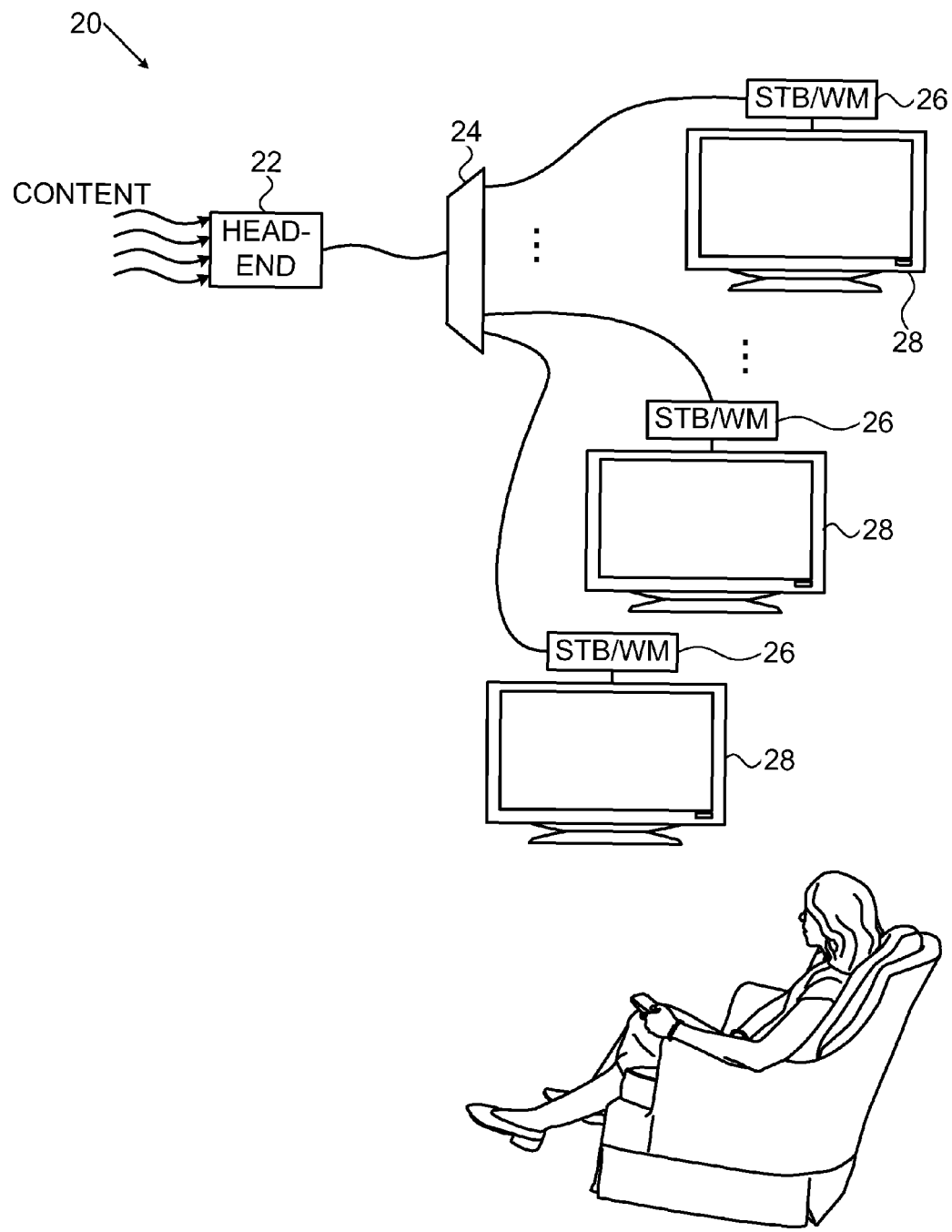
FIG. 1 is a schematic, pictorial illustration showing a video distribution system, in accordance with an embodiment of the present invention.

FIG. 1 is a schematic, pictorial illustration showing a video distribution system 20, in accordance with an embodiment of the present invention. A head-end transmits content via a distribution network 24 to multiple subscribers. The distribution network may comprise, for example, a cable entertainment network, a satellite network, a packet network (such as wired and/or wireless Internet), or any other suitable type of data communication network that is known in the art. Head-end 22 transmits the content to each subscriber in the form of encoded video, such as a stream encoded in accordance with H.264 or any other applicable digital standard, or possibly as a modulated analog video signal (which is also considered to be "encoded" in the present context).

Each subscriber receives the encoded content in a video playback device 26 with watermarking (WM) capabilities, as described below. In the pictured embodiment, device 26 has the form of a television set top box (STB), which decodes the video content in order to output a series of video frames to a television monitor 28. Alternatively, video playback devices 26 may comprise any suitable sort of video decoder and may be implemented either as freestanding units, as shown in the figure, or in the form of embedded processing circuitry within a display device, such as a computer, entertainment console, or mobile media player.

Video playback devices 26 in system 20 generally output standard video signals, which may be input to any sort of standard display device (such as monitors 28) or to a video recorder. Once the content has been recorded in this manner, it may be difficult or impossible, despite legal constraints, to prevent subscribers from distributing copies of the content. To enable this sort of unauthorized copying to be tracked, playback devices 26 are programmed to add a watermark to the series of standard video frames that they output. The method of watermarking may be chosen, as described below, so that the watermark is visually imperceptible to the subscribers but can be identified subsequently by comparing the copied video to the original.

Figure 2:
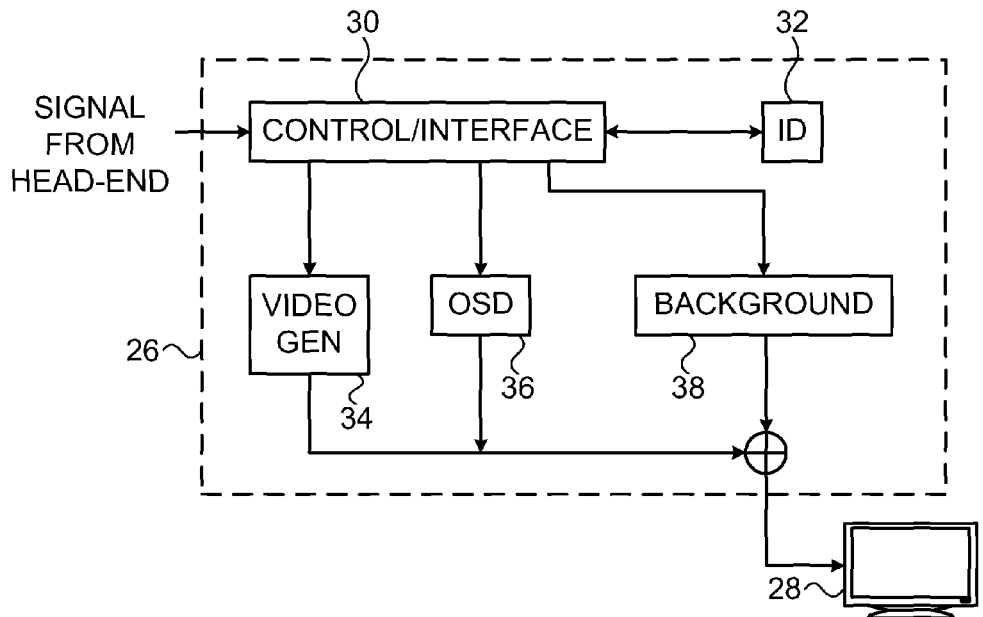
FIG. 2 is a block diagram that schematically illustrates a video playback device, in accordance with an embodiment of the present invention.

FIG. 2 is a block diagram that schematically shows details of video playback device 26, in accordance with an embodiment of the present invention. Device 26 has an identification number stored in a memory 32, which is typically programmed in advance by the manufacturer or network operator. Memory 32 may be built into device 26 or it may be contained on a removable card. In either case, the identifier in memory 32 is uniquely identified with the subscriber to whom device 26 is assigned.

Device 26 comprises processing circuitry, including a network interface and controller 30, which receives signals from head-end 22. These signals typically include both encoded video and control commands. Controller 30 passes the encoded video to a video generator circuit 34, which decodes the encoded video and generates a series of standard video frames for output to monitor 28. Controller 30 may also activate an on-screen display circuit 36, to generate menus and other text, and a background circuit 38. The outputs of circuits 34, 36 and 38 are overlaid on one another so that the video frames output to monitor 28 are an integral combination of all three.

In a typical set-top box, the background generated by circuit 38 is blue or black, and its intensity (which is typically expressed in terms of "transparency") is set to 0% when actual video content is being displayed. In practice, however, set-top boxes (and other display devices) can generally set the background to any desired color and intensity. Controller 30 can be programmed in firmware (or other software) to modulate the background color and/or intensity, and to commence and/or terminate the modulation in response to commands from head-end 22.

Embodiments of the present invention take advantage of these capabilities of controller 30 and background circuit 38 to embed a watermark in the series of video frames that are output by device 26. During watermarking, circuit 38 increases the background intensity by a small percentage (typically on the order of 1-2% of the full intensity scale of the monitor) and modulates the color of the background at a low modulation frequency. In other words, circuit 38 generates a background having an overall level that is modulated according to the identification code (such as the number stored in memory 32), and this background is then summed with the decoded video content. The modulation causes subtle, periodic color variations in the video frames and in the video images presented on monitor 28. These changes are imperceptible to even a skilled and sensitive human viewer, but they can be detected by suitable automated equipment, comprising any suitable combination of hardware and software, as shown below in FIG. 4.

To generate the modulation, the background level may be defined in a color space that comprises separate luminance and chrominance coordinates. Color spaces that may be used for this purpose, for example, include the well-known YUV and YIQ coordinate systems. In these systems, Y is a single coordinate representing the luminance, while U and V or I and Q are a pair of coordinates representing the chrominance along orthogonal axes. Although modulation of the luminance could be used as part of the watermarking procedure, the inventor has found that modulating only the color coordinates is useful in terms of hiding the watermark from human viewers, as well as facilitating automated detection.

As another alternative, the color axes may rotated 45° from the IQ frame for the purpose of inserting the watermark. The use of this rotated coordinate system (referred to as YDZ) is advantageous because the axes and scale of the IQ coordinates were chosen to have maximal effect on human visual perception for high and low frequencies, respectively. When the watermark is inserted in the rotated DZ coordinates, the visual effect of the watermark is diminished, since the rotation reduces the intensity of the watermark in each of I and Q, after converting back to IQ coordinates, by a factor of $1/\sqrt{2}$.

To generate the background modulation pattern, controller 30 computes a string of bits based on the identification number that is stored in memory 32. For example, the string may be created by concatenating the identification number with the current date and time to create an input word. The controller may compute an error correction code (ECC) over the input word, thus creating a codeword to serve as the complete string. (Some details of the ECC are presented in an Appendix below.) The controller converts the bits of the codeword into symbols, which determine the watermark modulation pattern.

The components of the processing circuitry in device 26 that are illustrated in FIG. 2—controller 30, video generator circuit 34, on-screen display circuit 36, and background circuit 38—are shown as separate functional components for the sake of conceptual clarity. In practice, some or all of the functions may be combined in a single physical component or, alternatively, implemented using multiple physical components. These physical components may comprise hardwired or programmable devices, or a combination of the two. In some embodiments, at least some of the functions of the processing circuitry may be carried out by a programmable processor under the control of suitable software. This software may be downloaded to device 26 in electronic form, over a network, for example. Alternatively or additionally, the software may be stored in tangible, non-transitory computer-readable storage media, such as optical, magnetic, or electronic memory.

Figure 3:
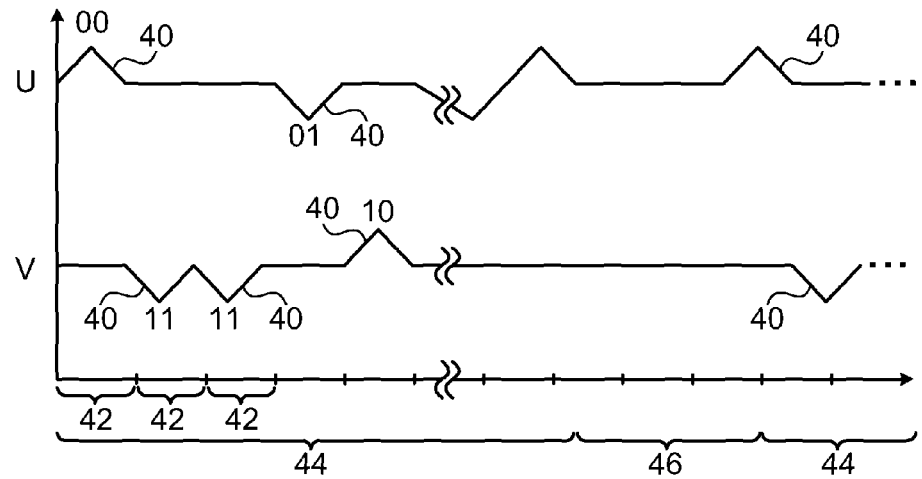
FIG. 3 is a plot showing video watermarking signals over time, in accordance with an embodiment of the present invention.

FIG. 3 is a plot of video watermarking signals over time, which are generated in this manner in accordance with an embodiment of the present invention. The modulation pattern has the form of sequences of triangular waveforms 40 in the U and V coordinates. During each waveform period 42, only one of the U and V coordinates is modulated (not both), to reduce possible ambiguities in decoding. As shown in the figure, the modulation pattern uses a constellation of four symbols, each corresponding to a different pair of bits:

00—positive triangle in U.

01—negative triangle in U.

10—positive triangle in V.

11—negative triangle in V.

The baseline value of the U/V coordinates, relative to which the "positive" and "negative" triangles rise or drop, is by convention around 128.

The inventor has found the following modulation parameters to give good results, in terms of facilitating automated detection of the watermark while remaining imperceptible to human viewers:

| Background Intensity | Amplitude U | Amplitude V |
|---|---|---|
| 1% | 64 | 48 |
| 2% | 32 | 24 |

The amplitudes listed in the table correspond to the difference between the peak of the triangular waveform and the baseline. Waveform period 42 is set to be much longer than the video frame duration, typically at least ten times the frame duration, so that the background color changes slowly over a succession of frames. The inventor has found that setting the waveform period to 3.2 sec (nearly one hundred times the standard video frame duration of 33 or 40 ms) gives good results.

Assuming that controller 30 generates codewords that are n bits long, the four-symbol alphabet defined above will give a modulation pattern 44 comprising n/2 symbols, with two bits per symbol. For example, assuming the codeword (identifier, date/time and ECC) to be sixty bits long, pattern 44 will comprise thirty symbols, so that the duration of pattern 44 is thirty times waveform period 42, giving a pattern duration of 96 sec.

Controller 30 repeats pattern 44 multiple times in the course of presenting a given video item. The recurring patterns 44 are separated by intervals 46. It is desirable that these intervals not be integer multiples of waveform period 42. Rather, in the present example, interval 46 is a half-integer multiple of the waveform period t, i.e., the interval duration is $(m+\frac{1}{2})t$, wherein m may be any positive integer. (In the pictured example, m=2, so that interval 46 is eight seconds long.) The reason for this choice is to assist the automated detector when processing a watermarked video sequence to find the start and end of the modulation patterns: If the detector finds two triangular waveforms in the video sequence whose peaks are separated by a non-integer number of waveform periods, it will conclude that the waveforms belong to different instances of the modulation pattern, with the beginning of the second instance located somewhere between them.

Alternatively, other sorts of modulation schemes may be applied to encode the watermark in the background color of the series of video frames. Other symbol constellations may be used, such as constellations that encode only a single bit per symbol. As another example, frequency modulation may be used, i.e., the background color may be varied with a sinusoidal or other periodic profile, and the frequency of the sinusoid (or other profile) may be varied to encode the successive bits of the watermark. All such alternative background modulation schemes are considered to be within the scope of the present invention.

Figure 4:
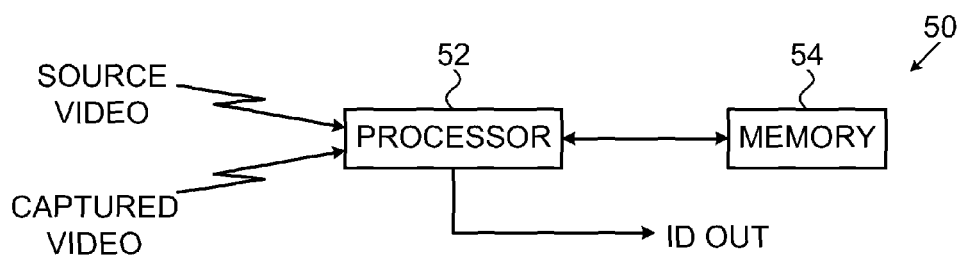
FIG. 4 is a block diagram that schematically illustrates a video watermark reader, in accordance with an embodiment of the present invention.

FIG. 4 is a block diagram that schematically illustrates an automated video watermark reader 50, in accordance with an embodiment of the present invention. Reader 50 comprises a processor 52, which is typically a general-purpose computer processor and is programmed in software to carry out these watermark reading functions. Processor 52 reads in an original source video recording and compares it with another recording of the same video content that has been captured from an unauthorized source. For example, this video content may have been downloaded from a file sharing Web site. Processor 52 compares the video versions, typically by aligning and normalizing the two video inputs and then computing a difference between them. Interim results during this process may be stored in a memory 54.

Processor 52 measures the color of the difference remaining after subtraction, and tracks changes in the color over time in order to reconstruct the watermark. The error correction code in the watermark may be used, if necessary, to correct bit errors. The processor thus extracts and outputs the identification code of the playback device from which the captured video was originally recorded, as well as the date and time of the recording.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Generation of Modulation Patterns With Error Correction

Various types of error correction codes may be used in the watermark. For example, a cyclical redundancy code (CRC) is sufficient for some purposes. In the two-bits-per-symbol alphabet defined above, however, a pair of successive bits may be lost each time processor 52 is unable to detect one of the triangular waveforms 40 in the modulation pattern. A Reed-Solomon code based on the Galois field (2,n) can be used effectively to deal with such two-bit errors, wherein n is the number of bits per symbol in the codeword. A code based on a Reed-Solomon polynomial of degree d=8, for example, can be used to recover up to two corrupted bit pairs.

The polynomial and the codeword operations to be performed using the polynomial are defined below using the following terms:

F is a fixed Galois field.
A Block is an element of F. If F=G(2,n), wherein n is a constant, the block is identified with the corresponding sequence of n bits.
A String is a sequence of blocks.
$L_c$ is the length of the string c (in blocks).
A Full string is sequence of L blocks (for the given codeword length L).
a∥b is the concatenation of the strings a and b.
A Base polynomial f is a fixed polynomial on the field F.
d is the degree of f, also referred to as the "redundancy" of the code.

For each string $c=\{c_0 c_1 \ldots c_{D-1}\}$, controller 30 computes the corresponding polynomial $P_c(x)=c_0+c_1x+\ldots C_{L1}x^{D-1}$. A string $c=\{c_0 c_1 \ldots c_{L-1}\}$ is acceptable if its polynomial $P_c=0$ mod f. The most useful technique of Reed-Solomon coding (and CRC for the field $Z_2$) is cyclic coding—in which $x^L-1=0$ mod f.

Notwithstanding the error correction code, however, ambiguities in the color modulation signal extracted by reader 50 at the beginning and end of the watermark may lead to situations in which the starting point of the string is uncertain, and therefore the error correction code itself gives uncertain results. To illustrate this situation, we use the following terms:

k is small natural number (typically k=1, although it may have any value satisfying k<d/2 and in the best case may satisfy k=d−1).
a and b are short strings, $L_a=L_b=k$.
m is an "almost full" string, $L_m=L-k$.

An ambiguous situation arises when a∥m and m∥b both are acceptable results of decoding the watermark. This sort of situation can occur, for example, when $P_a=P_b=0$. To avoid such situations, controller 30 may modify the polynomial codeword c by adding it (as an element of the field F) to a constant string $r=\{r_0 r_1 \ldots r_{L-1}\}$. For the case of F=G(2,n), the addition is carried out by exclusive disjunction (XOR). Mathematical analysis shows that the string r should be chosen such that its polynomial $P_r$, of degree d, is not a member of all the linear subspaces $V_i=\{G_iP_a+H_iP_b|$ for all a,b such that $\deg(P_a)<k, \deg(P_b)<k\}$ for i=1 . . . k, wherein $G_i$ and $H_i$ are special polynomials meeting the requirements that $(x^i-1)G_1=1$ mod f and $(x^i-1)H_i=x^L$ mod f. (For the existence of $G_i$ and $H_i$, it is sufficient to require that f is co-prime with $(x^i-1)$ for all i=1 . . . k.) It can be shown that in the common case, $P_r$ satisfying this criterion exists for $k=\lfloor d/2 \rfloor$; and in the case of cyclic coding (in which $x^L-1=0$ mod f, as noted above) such $P_r$ exists even for k=d−1.

Performing the above-mentioned XOR operation with r will prevent the occurrence of ambiguous results at the ends of the watermark. For reliable watermarking, it is desirable that r be "balanced," containing approximately equal numbers of ones and zeros. To choose the appropriate value of r, balanced strings can be tested at random until a string is found satisfying $P_r \notin V$ for all i=1 . . . k. For example, for the case in which L=30, d=8, and F=GF(2,2) with cyclic coding, there are several polynomials that satisfy these criteria, and their use makes it possible to identify the start of the strings up to k=7.

The invention claimed is:

1. A method for data display, comprising:
storing an identification code;
receiving encoded video content for playback; and
decoding the encoded video content so as to output a series of video frames while modulating a background level of the video frames in the series according to the identification code, wherein the modulating of the background level comprises generating a background having an overall level that is time modulated according to the identification code, and summing the background with the decoded video content.

2. The method according to claim 1, wherein the identification code uniquely identifies: a video playback device, which decodes and modulates the background level of the video frames; or a subscriber to whom the video playback device is assigned.

3. The method according to claim 2, wherein the encoded video content is received in the video playback device from a transmission head-end, and wherein modulating the background level comprises receiving an instruction from the transmission head-end to begin modulating the background, and modulating the background responsively to the instruction.

4. The method according to claim 1, wherein modulating the background level comprises modifying a color of the background.

5. The method according to claim 4, wherein the background level is defined by a luminance coordinate and two chrominance coordinates, and wherein modifying the color comprises modulating the two chrominance coordinates.

6. The method according to claim 5, wherein modulating the two chrominance coordinates comprises encoding the identification code using an alphabet comprising four symbols mapped over the two chrominance coordinates.

7. The method according to claim 5, wherein modulating the two chrominance coordinates comprises applying a modulation in a chrominance coordinate system that is rotated so as to diminish a visual effect of the modulation.

8. The method according to claim 4, wherein modifying the color comprises modulating the color of the background with a triangular waveform.

9. The method according to claim 1, wherein the video frames have a predetermined frame duration, and wherein the background level is modulated with a modulation waveform having a period that is at least ten times the frame duration.

10. The method according to claim 9, wherein modulating the background level comprises generating a string of symbols representing the identification code, defining a modulation pattern corresponding to the string of the symbols, and applying the modulation pattern to the background level multiple times in succession, separated by an interval that is not an integer multiple of the modulation period.

11. The method according to claim 1, wherein the background level is modulated independently of the video content.

12. The method according to claim 1, wherein modulating the background level comprises computing a codeword comprising the identification code and an error correcting code, generating a string of bits by taking an exclusive disjunction between the codeword and a selected constant word, and varying the background level over time according to the bits in the string.

13. Data display apparatus, comprising:
a memory, which is configured to store an identification code; and
processing circuitry, which is coupled to receive and decode encoded video content so as to output a series of video frames while modulating a background level of the video frames in the series according to the identification code, wherein the processing circuitry is configured to generate a background having an overall level that is time modulated according to the identification code, and to sum the background with the decoded video content.

14. A software product, comprising a non-transitory computer-readable medium in which program instructions are stored, which instructions, when read by a processor, cause the processor to read an identification code from a memory, and to receive and decode encoded video content so as to output a series of video frames while modulating a background level of the video frames in the series according to the identification code, wherein the instructions cause the processor to generate a background having an overall level that is time modulated according to the identification code, and to sum the background with the decoded video content.

* * * * *